United States Patent [19]

Beard et al.

[11] Patent Number: 5,317,663
[45] Date of Patent: May 31, 1994

[54] ONE-PIECE SC ADAPTER

[75] Inventors: Michael S. Beard, Eden Prairie; Curtis Puetz, Apple Valley; James W. Conroy, Prior Lake, all of Minn.

[73] Assignee: ADC Telecommunications, Inc., Minneapolis, Minn.

[21] Appl. No.: 65,139
[22] Filed: May 20, 1993
[51] Int. Cl.⁵ .......................... G02B 6/00; G02B 6/36
[52] U.S. Cl. ....................................................... 385/70
[58] Field of Search ...................................... 385/70-73

[56] References Cited

U.S. PATENT DOCUMENTS

| | | | |
|---|---|---|---|
| 3,923,371 | 12/1975 | Dalgleish | 385/70 |
| 4,676,589 | 6/1987 | Miyashita et al. | 385/70 X |
| 4,824,203 | 4/1989 | Kunze et al. | 385/70 |
| 4,890,897 | 1/1990 | Cook | 385/70 |
| 5,125,058 | 6/1992 | Tenerz et al. | 385/70 |

Primary Examiner—Akm E. Ullah
Attorney, Agent, or Firm—Merchant, Gould, Smith, Edell, Welter & Schmidt

[57] ABSTRACT

An adapter for holding two fiber optic connectors in coaxial alignment. The connectors include a generally cylindrical ferrule having an axial bore and a ferrule holder having means for retaining the ferrule and a raised ridge located on its outer surface. The connector further includes a grip housing having an axial bore in which the ferrule holder is located. The grip housing also includes a cut out through which the raised ridge of the ferrule holder is exposed. The adapter comprises a unitary main body having an axial bore connecting a first opening and a second opening. The axial cavity is sized to receive an inner housing. The inner housing has at least one retaining clip which is located exterior to an axial chamber within the inner housing. The retaining clip includes means to releasably lock the raised ridge of the ferrule holder in place when said connector is inserted into the axial cavity of the adapter.

3 Claims, 4 Drawing Sheets

ONE-PIECE SC ADAPTER

TECHNICAL FIELD

This invention relates generally to fiber optics and more particularly to an improved adapter for coaxially connecting fiber optic cables.

BACKGROUND OF THE INVENTION

Fiber optics have revolutionized communication through out the world. Fiber optics are generally thin strings of glass designed to carry light which can be grouped together.

With the increased use of fiber optics it has become increasingly important to be able to connect and disconnect fiber optic cables from various sources. Two fiber optic cables can be optically coupled so that they are in communication with one another by using well-known SC connectors and an adapter, thereby putting each fiber optic cable in communication with the other. The SC connectors are placed on the end of each cable and then plugged into the adapter. The adapter has two openings, each one designed to receive a connector. The adapter is usually fixed to a dividing member.

The adapter of the prior art consisted of two halves, each halve being identical. Each half consisted generally of a rectangular cylinder having a flange at one end. Inside each half would be placed half of an inner housing. The inner housing being generally a round cylinder, with a flange at one end, and a pair of retaining clips, extending parallel to the cylinder from the flange. Each adapter half had a ridge located just inside from its flange so that the inner housing could be placed in the adapter through the opening proximate to the flange on the adapter half. Once the inner housing were inserted into each adapter half, the two halves were connected by ultrasonically welding the two flanges of the adapter halves together.

This design presented serious problems. The cables naturally flexed in use, while the adapter remained fixed. The related stresses of this situation caused the two halves of the adapter to separate after time. In the prior art, this problem was solved by constructing the adapter halves from metal which gave the adapter enough strength to withstand these stressed. However, this too presented a problem as metal is much more expensive to purchase and mold than the plastic it replaced.

The present invention has significant advantages over the construction of the prior art in that the present invention teaches an adapter that can be constructed out of plastic in a unitary fashion. The main body has an access opening to the interior. The access opening allows the adapter to be molded in a single piece, as with out the access opening negative draft would make it impossible to construct the adapter in a single piece. The access opening further allows an inner housing to be inserted into the main body.

SUMMARY OF THE INVENTION

According to the preferred embodiment of the present invention, an adapter is shown used to connect two SC style connectors. The adapter includes a unitary main body with an axial cavity extending between a first opening and a second opening. The adapter also includes an inner housing sized to be received with the cavity. The inner housing having an axial chamber and a retaining clip located exterior to the chamber so that the clip may releasably lock a ferrule holder into place. Each ferrule holder is operable in placing the fiber optics in communication within the axial chamber of the inner housing.

DESCRIPTION OF THE PREFERRED EMBODIMENT

Figure 1:
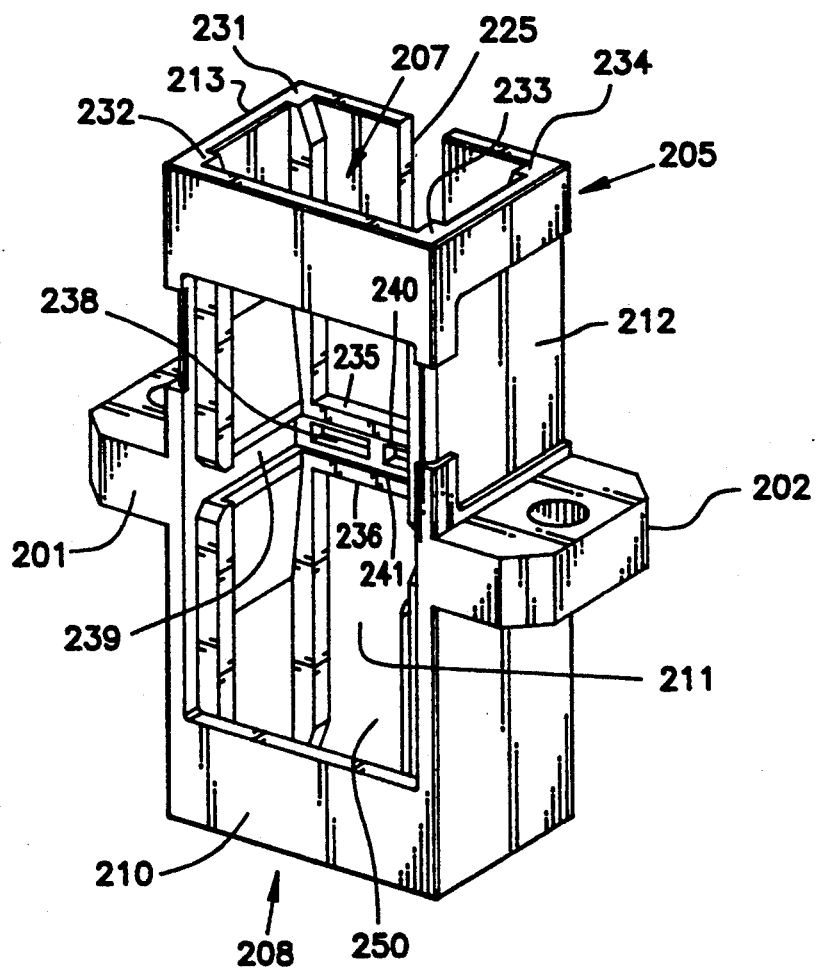
FIG. 1 is a perspective view of the unitary main housing.
Figure 2:
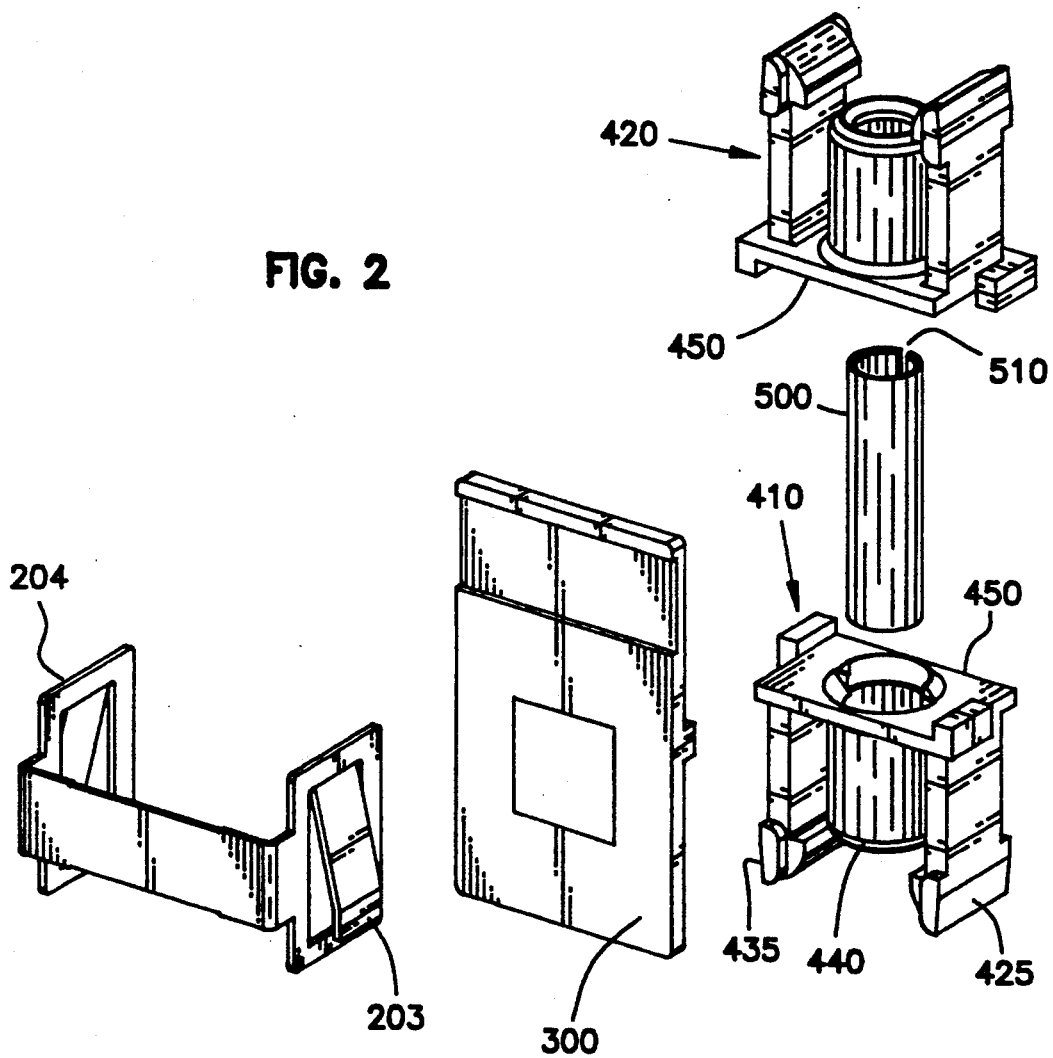
FIG. 2 is a perspective view of the inner halves, the access plate and the exterior retaining clip.

Referring generally to FIGS. 1 and 2 there is shown an adapter for connecting two SC style connectors in coaxial alignment and a SC style fiber optic connector. This arrangement allows two separate fiber optic cables to be optically coupled.

SC Connector

Figure 3:
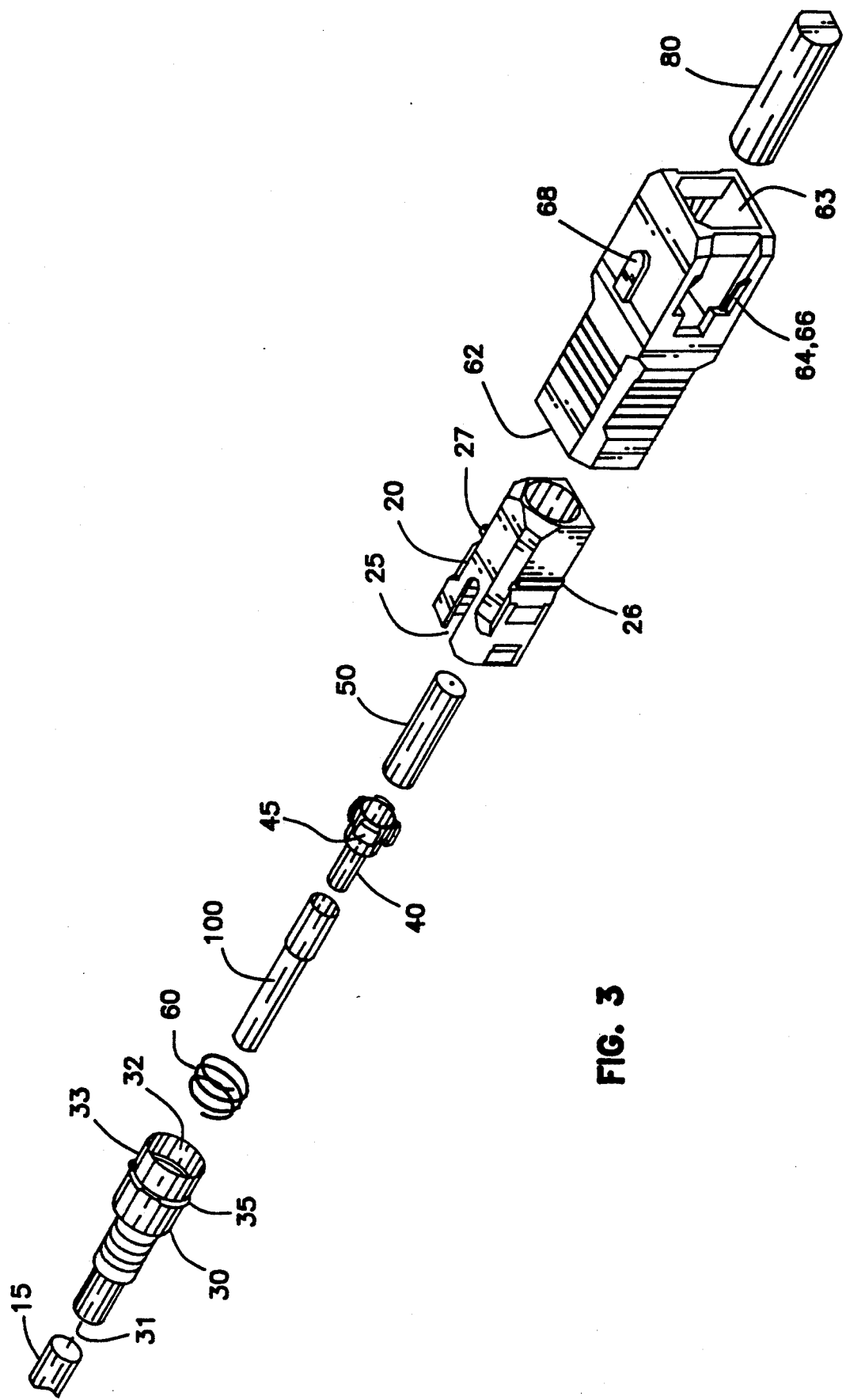
FIG. 3 is a cut-away view of an SC style connector.

As shown in FIG. 3, an SC style connector is generally constructed out of plastic. The fiber optic cable 15 enters into the SC connector through guide 30. Guide 30 has an input opening 31 at one end to receive the fiber optic cable 15 and a hub opening 32 at its other end. The input opening 31 of the guide 30 shares its diameter with the first portion of the guide 30 while the hub opening 32 shares its diameter with remainder of the guide 30.

Located within the guide 30 is tubing 100 which surrounds the outer diameter of the fiber optic cable 15. Tubing 100 aids in guiding the fiber optic cable 15 into the ferrule 50. Within the guide 30 is a coil spring 60, coil spring 60 surrounds tubing 100, spring 60 is operative in allowing the fiber optic cable 15 a small amount of travel when tensioned.

The hub 40 is designed to be connected to the ferrule holder 20. Hub 40 has four tabs or keys 45 spaced 90 degrees apart from each other. Hub 40 fits within the guide 30 through its input opening 31. Hub 40 is operative in retaining spring 60 in the guide 30. Ferrule 50 fits within hub 40 and firmly holds the fiber optic cable 15 in place.

Key 35 is located on the outer surface of the guide 30. This key is designed to fit into slot 25 located on the ferrule holder 20. Once key 35 is in place the guide 30 is firmly locked into the ferrule holder 20.

The ferrule 50 is used to hold the fiber optic cable 15 firmly in place. It is well known in the art how the ferrule 50 is constructed and that it is used to support fiber optic cables.

The ferrule holder 20 holds the ferrule 50 rigidly in its axial bore. The ferrule holder 20 has a generally rectangular cross section. On opposite sides of the exterior of ferrule holder 20 are two sets of parallel ridges 26 and 27, which are generally perpendicular to the axial bore of ferrule holder 20. These ridges are designed to be releasably locked to retaining clips 203 and 204 of inner housing 420 through cut-outs 64 and 664 respectively. Ferrule holder 20 is located within the outer connector or grip housing 60.

The grip housing 60 generally has four sides and an opening 62 to receive the guide 30 and an opening 63 to deliver ferrule 50 to the split sleeve 500. When ferrule holder 20 is placed within the grip housing 60 each pair of raised ridges 26 and 27 are exposed through a cut out 64 and 66 respectively. On a side generally 90 degrees from one of the cut-out sides key 68 is located. Key 68 is designed to fit into slot 225 located on one of the side-walls of the unitary main body 205 of the adapter.

The construction and specifications of SC style connectors is well known to those skilled in the art. Modifications to the above described connector would be obvious to one skilled in the art. A description of the connector is included only to clarify the environment in which the inventive adapter operates.

Adapter

Figure 4:
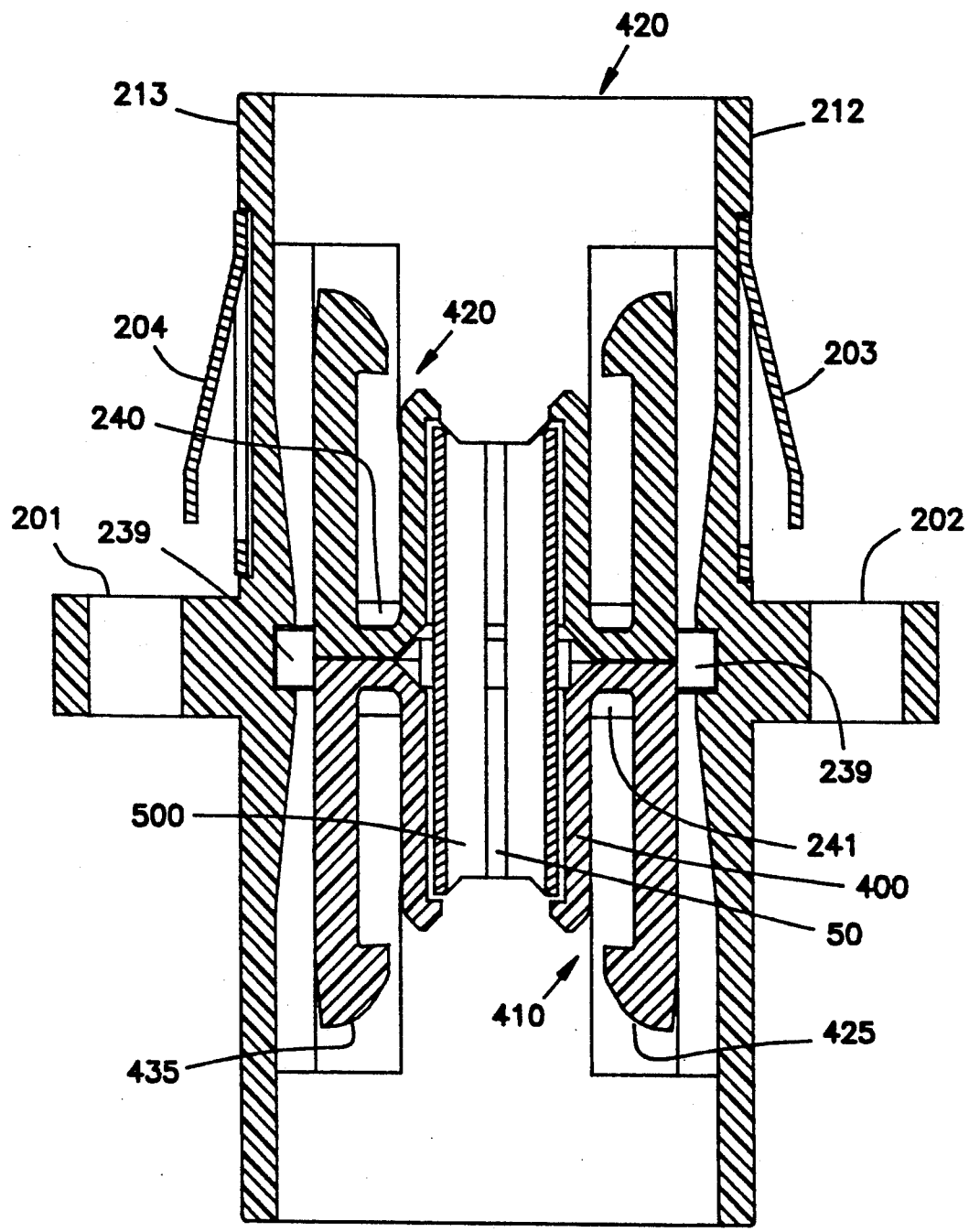
FIG. 4 is a cross-sectional view of FIGS. 1 and 2 as assembled.

The adapter 10 as shown in FIGS. 1, 2 and 4 contains a unitary main body 205 and an access plate or cover 300. In the preferred embodiment, the unitary main body 205 has an axial cavity, defined by top side-wall 210, bottom side-wall 211, right side-wall 212, and left side-wall 213. The axial cavity of the main body 205 extends between a first opening 207 and a second opening 208.

Located on the exterior of the main body 205 are a pair of tabs 201 and 202. One tab is located on right side-wall 212 and one tab is located on left side-wall 213. The tabs 201 and 202 are operative in supporting the adapter 10 on a planar surface.

To lock the adapter into place on a planar surface there is further provided a pair of outside retaining clips 203 and 204 one clip associated with each tab 201 and 202 respectfully. When the adapter is in place on a planar surface, the surface abuts with the tab on one side and an outer retaining clip on its other side, thereby holding it in place.

The inner cavity of unitary main body 205 contains a plurality of ridges and grooves used to hold an inner housing in place which in turn is used to hold ferrule, 50 and ferrule holder 20 in a fixed position. The ridges are located as follows: one ridge is associated with each corner of the inner cavity 231,232,233 and 234, of main body 205 and a pair of ridges 235 and 236, are located on the inner surface of bottom side-wall 211. Ridges 235 and 236 are generally perpendicular to the axial cavity of main body 205.

Parallel ridges 235 and 236 define groove 238 which is perpendicular to the axial cavity of main body 205. Groove 238 is half way between first opening 207 and second opening 208 of the main body 205. Ridges 235 and 236 on bottom side-wall 211 are connected by approximately two parallel ridges 241 and 242. Ridges 241 and 242 have a slightly decreased thickness, so as to decrease the depth of groove 238. The width of groove 238 is equal to the thickness of combined flanges 450 of the inner housing, halves 410 and 420. The right side-wall 212 and the left side-wall 213 each have a groove 239 that is collinear with groove 238.

Ridges 235 and 236 on bottom side-wall 211 provide a stop to the grip housing 60 as it is inserted into unitary body 205 and to give support to the inner housing halves 410 and 420. Grooves 238 and 239 also give support to inner housing halves 410 and 420.

Located on the top side-wall 210 is an access opening 310. Access opening 310 allows inner housing halves 410 and 420 to be inserted into the axial cavity of main body 205 and also allows main body 205 to be constructed by injection molding.

Inner housing halves 410 and 420 are identical. Each inner housing half is constructed of plastic by an injection molding process. Each half includes cylinder 440 and at one end of cylinder 440 is flange 450. Flange 450 is generally rectangular in shape. Two halves 410 and 420 are connected at their respective flanges 450 respectfully so as to define a common cylinder. Two flanges 450 define a thickness which is equal to that of grooves 238 and 239. Attached to each flange of the inner housing halves are a pair of retaining clips 425 and 435. Each retaining clip extends away from each flange parallel to cylinder 440. The inner housing halves are placed in main body 205 by aligning the flange 450 of inner housing half 410 with collinear grooves 238 and 239 and sliding it into place within unitary main body 205. The other half of the inner housing is inserted into main body 205 in the same fashion.

Cylinders 440 of inner housing halves 410 and 420 are coaxial in main body 205 and define a common cylinder. Located in the common cylinder is a split sleeve 500 generally cylindrical in shape, with a split, or slot 510 running the length of the cylinder. Split sleeve 500 is generally constructed of copper and its dimensions are well known in the art. It is in the common cylinder defined by inner halves 410 and 420 where ferrules 50 of different fiber optic cables 15 meet and are in optical communication.

In the preferred embodiment, access panel 300 covers access opening 250. Ridges 232 and 233 that extend along the corners of the inner surface of main body 205 define two shelf surfaces one on left side-wall 213 and one on right side-wall 212 that the access cover can rest on. The access cover is then ultrasonically welded to the shelf so that it is permanently in place.

The system of inner grooves and ridges on main body 205 make injection molding main body 205 difficult. Generally, when injection molding a piece having an axial cavity one cannot have grooves on the inside which are perpendicular to the direction of injection molding. Perpendicular grooves create negative draft which makes injection molding almost impossible. This problem is addressed in the present invention by utilizing three directions in the molding process. The first direction is from the first opening, 207, and the second direction is from the second opening, 208, making the first and second directions coaxial. The third direction is through access opening 250. By injecting from this direction the grooves that are perpendicular to the other direction of injection may be formed.

In operation a first connector is placed in opening 207 of main body 205. This is done by lining up key 27 of grip housing 60 with slot 225 on main body 205. Upon pushing grip housing 60 into opening 207 retaining clips 425 and 435 engage parallel ridges 26 and 27. Another connector is inserted into the other opening of the adapter in the same way.

The above examples are not intended to limit the invention, but merely to serve as an illustration of how the invention might operate.

In light of the above teachings it will be appreciated that several variations of the disclosed embodiments are possible. Those skilled in the art will no doubt be able to utilize the teachings of this invention other than as specifically described above. Certainly substitution of other materials would be obvious. Therefore it is to be understood that the following invention is to be limited by the following claims.

I claim:

1. An adapter for holding two fiber optic connectors in coaxial alignment, each of said connectors including a generally cylindrical ferrule having an axial bore, a ferrule holder having means for retaining said ferrule and having, an outer surface with at least one raised ridge located on said outer surface of said ferrule holder, said connector further including a grip housing having an axial bore, said ferrule holder being located within said axial bore of said grip housing, and said ferrule being located within said axial bore of said ferrule holder, said grip housing further having at least one cut-out, said raised ridge of said ferrule holder being exposed through said cut out; said adapter comprising:

a) a unitary molded main body having an axial cavity, said axially cavity extending from a first opening to a second opening, with a first side-wall extending from said first to second opening, an inner housing sized to be received within said axial cavity, said inner housing having an axial chamber and at least one retaining clip located exterior to said chamber and said clip being generally parallel to said axial chamber, said clip having locking means for releasable locking onto said raised ridge of said ferrule holder, said main body further having an access opening formed through said first side-wall, wherein said ferrule is received within said chamber, and said clip is locked onto said ridge on said ferrule holder.

2. An adapter as in claim 1 further comprising a panel covering said access opening.

3. An adapter for holding two fiber optic connectors in coaxial alignment, each of said connectors including a ferrule having an axial bore, a ferrule holder located concentrically about said ferrule, said ferrule holder further having an outer surface with at least two raised ridges located thereon, said connector further including a grip housing having an aperture, said ferrule holder being located within said grip housing so that said two raised ridges are exposed through said aperture, said adapter comprising:

a) an inner housing having an axial bore, and at least one locking arm; and b) a unitary main body having an axial cavity between a first end opening and a second end opening, an access opening generally perpendicular to said axial cavity, means for locking said inner housing in said axial cavity wherein said connector can be inserted into one of said end openings and said locking arm will lock onto said raised ridges of said ferrule holder, and said inner housing will be received within said axial bore of said ferrule holder.

* * * * *